United States Patent
Zhang et al.

(10) Patent No.: US 9,738,268 B1
(45) Date of Patent: Aug. 22, 2017

(54) DECELERATION CONTROL SYSTEM FOR A HYBRID VEHICLE

(71) Applicant: FORD GLOBAL TECHNOLOGIES, LLC, Dearborn, MI (US)

(72) Inventors: Chen Zhang, Weatland, MI (US); Rajit Johri, Canton, MI (US); Scott James Thompson, Canton, MI (US); Ming Lang Kuang, Canton, MI (US); Jeffrey Allen Doering, Canton, MI (US); Mathew Alan Boesch, Plymouth, MI (US); David Crist Gabriel, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/050,776

(22) Filed: Feb. 23, 2016

(51) Int. Cl.
| | |
|---|---|
| *B60L 9/00* | (2006.01) |
| *B60K 6/48* | (2007.10) |
| *B60W 20/13* | (2016.01) |
| *B60W 10/06* | (2006.01) |
| *B60W 10/08* | (2006.01) |
| *B60K 6/22* | (2007.10) |

(52) U.S. Cl.
CPC .............. *B60W 20/13* (2016.01); *B60K 6/22* (2013.01); *B60W 10/06* (2013.01); *B60W 10/08* (2013.01); *B60W 2540/10* (2013.01); *B60W 2710/0627* (2013.01); *B60W 2710/083* (2013.01); *B60Y 2200/92* (2013.01); *B60Y 2300/18125* (2013.01); *B60Y 2300/43* (2013.01); *B60Y 2300/60* (2013.01); *B60Y 2300/91* (2013.01); *Y10S 903/904* (2013.01); *Y10S 903/93* (2013.01)

(58) Field of Classification Search
USPC ......................................... 701/22; 180/65.25
See application file for complete search history.

(56) References Cited

U.S. PATENT DOCUMENTS

| | | | |
|---|---|---|---|
| 6,378,636 B1 | 4/2002 | Worrel | |
| 7,163,487 B2 | 1/2007 | Tao et al. | |
| 9,050,970 B2 | 6/2015 | Ueno et al. | |
| 2006/0113129 A1* | 6/2006 | Tabata | B60K 6/365 180/65.25 |
| 2007/0209850 A1* | 9/2007 | Bloomfield | B60L 11/1861 180/65.31 |
| 2008/0227589 A1* | 9/2008 | Zillmer | B60K 6/48 477/3 |
| 2015/0266383 A1* | 9/2015 | Kidston | B60L 7/26 701/70 |

* cited by examiner

*Primary Examiner* — Tyler Paige
(74) *Attorney, Agent, or Firm* — David Kelley; Brooks Kushman P.C.

(57) ABSTRACT

A vehicle control system includes a controller that is programmed to, in response to an accelerator lift-pedal event, generate a drag torque, with at least one of an engine and electric machine, having a magnitude that is based on a deceleration fuel shut-off torque of the engine and a desired power output of the electric machine, and limit the drag torque to a threshold value that is based on the deceleration fuel shut-off torque.

18 Claims, 4 Drawing Sheets

DECELERATION CONTROL SYSTEM FOR A HYBRID VEHICLE

TECHNICAL FIELD

The present disclosure relates to hybrid vehicles and methods of controlling deceleration in hybrid vehicles.

BACKGROUND

During vehicle deceleration, drag torque acting on the powertrain decreases as the vehicle speed decreases.

SUMMARY

A vehicle control system includes a controller that is programmed to, in response to an accelerator lift-pedal event, generate a drag torque, with at least one of an engine and electric machine, having a magnitude that is based on a deceleration fuel shut-off torque of the engine and a desired power output of the electric machine, and limit the drag torque to a threshold value that is based on the deceleration fuel shut-off torque.

A vehicle control system includes a controller that is programmed to, in response to a commanded magnitude of drag torque, that (i) results from an accelerator lift-pedal event and (ii) is based on an engine fuel shut-off torque and a generator torque required to produce a desired amount of electrical power, exceeding a threshold that is based on the engine fuel shut-off torque, generate an actual drag torque having a magnitude that does not exceed the threshold such that the generator torque produces less than the desired amount of electrical power.

A vehicle includes an engine, a generator, and a controller. The engine and the generator are respectively configured to, in response to an accelerator pedal lift-off event, produce a fuel shut-off torque and produce a drag torque. The controller is programmed to, in response to a sum of the fuel shut-off torque and the drag torque exceeding a threshold, limit the drag torque such that the generator generates an amount of electrical power less than a desired amount of electrical power.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
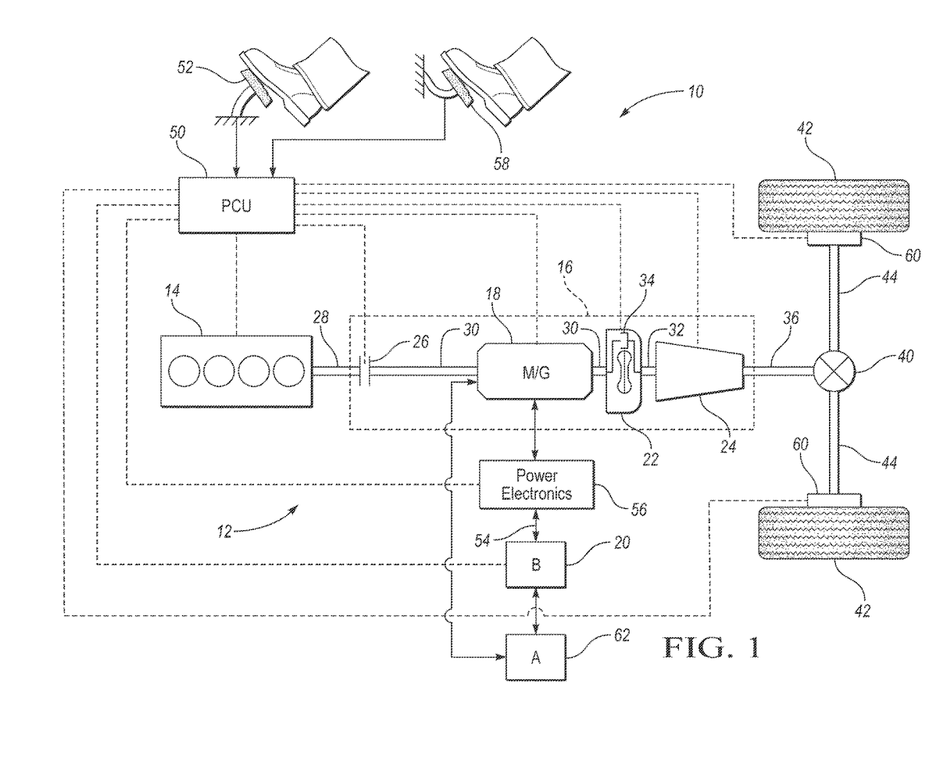
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

It should be understood that the schematic illustrated in FIG. 1 is merely representative and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
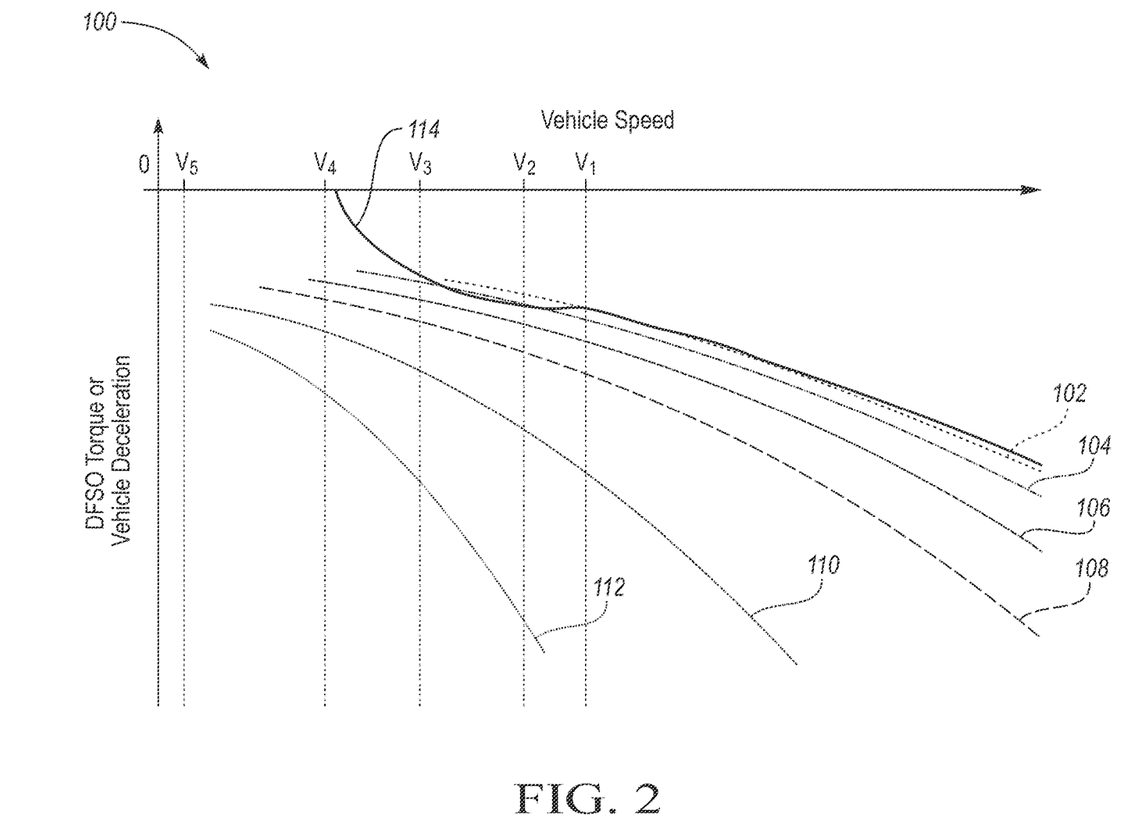
FIG. 2 is a representative graph illustrating vehicle deceleration relative to vehicle speed at different transmission gear ratios during a desired deceleration event of a conventional non-hybrid vehicle, and a desired deceleration fuel shut-off torque of the non-hybrid vehicle relative to vehicle speed during the desired deceleration event.

Referring to FIG. 2 vehicle deceleration relative to vehicle speed at different transmission gear ratios during a desired deceleration event of a conventional non-hybrid vehicle is illustrated in a representative graph 100. The vehicle deceleration may be measured at the output of the drivetrain (i.e., the wheels 42). The conventional non-hybrid vehicle includes an internal combustion engine, a multi-step ratio transmission gearbox, and a torque converter that includes a bypass (or locking) clutch. The graph 100 in FIG. 2 also illustrates a desired deceleration fuel shut-off (DFSO) torque at the output of the drivetrain (i.e., the wheels 42) relative to vehicle speed during the desired deceleration event. DFSO torque is a drag torque that is provided by the engine (through friction and compression forces) when the engine is coupled to the transmission by locking the bypass clutch of the torque converter, while at the same time cutting off the fuel supply to the engine so that it does not produce power. The engine may be said to be operating in a DFSO mode when providing DFSO torque. The desired deceleration event may correspond to a lift pedal event where the vehicle operator has released the accelerator pedal 52 while the vehicle is in motion. Furthermore, the desired deceleration event may correspond to a period after the operator has released the acceleration pedal 52 while at the same time not depressing the brake pedal 58. The horizontal axis represents the speed of the vehicle. The vertical axis represents either vehicle deceleration relative to various gear ratios or the desired DFSO torque at the output of the drivetrain. The deceleration and the desired DFSO torque are shown to have negative values in the graph 100. For simplicity purposes, any increase in deceleration or the desired DFSO torque refers to an increase in absolute value, which corresponds to a decrease in the value of the deceleration or the desired DFSO torque on the graph 100. The graph 100 illustrates the speed of six gear ratios, however, it should be understood that the illustrated graph 100 could be adapted and the concept described herein could apply to more or less than six gear ratios.

Several plotted lines represent the vehicle deceleration that will occur with a transmission gearbox in a particular gear during the desired deceleration event. The described example that includes six gear ratios, line 102 represents deceleration of the vehicle during the desired deceleration event with the transmission gearbox in 6th gear, line 104 represents deceleration of the vehicle during the desired deceleration event with the transmission gearbox in 5th gear, line 106 represents deceleration of the vehicle during the desired deceleration event with the transmission gearbox in 4th gear, line 108 represents deceleration of the vehicle during the desired deceleration event with the transmission gearbox in 3rd gear, line 110 represents deceleration of the vehicle during the desired deceleration event with the transmission gearbox in 2nd gear, and line 112 represents deceleration of the vehicle during the desired deceleration event with the transmission gearbox in 1st gear.

The desired DFSO torque during the desired deceleration event is represented by line 114. In order to maintain the desired DFSO torque during the desired deceleration event, the transmission gearbox may go through a series of downshifts as vehicle speed decreases. In the example depicted in FIG. 2, the transmission gearbox downshifts from 6th gear to 5th gear at vehicle speed $V_1$, from 5th gear to 4th gear at vehicle speed $V_2$, from 4th gear to 3rd gear at vehicle speed $V_3$, from 3rd gear to 2nd gear at vehicle speed $V_4$, and from 2nd gear to 1st gear at vehicle speed $V_5$. During the desired deceleration event the torque converter bypass clutch of the non-hybrid vehicle may be locked so that the desired DFSO torque will decelerate the non-hybrid vehicle. Once the vehicle decelerates to a particular vehicle speed, the torque converter bypass clutch will open and the desired DFSO torque will quickly approach zero.

In the depicted example, the torque converter bypass clutch is open at vehicle speed $V_3$ when the vehicle shifts from 4th gear to 3rd gear. In a conventional non-hybrid vehicle the torque converter bypass clutch may open at a speed that would be undesirable for a hybrid vehicle. A hybrid vehicle may include an electric motor/generator that is coupled to an input of the torque converter. The electric motor/generator may be configured to recover kinetic energy when the torque converter bypass clutch is in a locked condition during vehicle deceleration. In order to maximize the kinetic energy that is recovered during deceleration, the locked condition of the torque converter bypass clutch needs to be maintained at much lower speeds than is required in a conventional non-hybrid vehicle. For example, a torque converter bypass clutch may open at speeds in excess of 20 mph in a non-hybrid vehicle, while a hybrid vehicle that includes a motor/generator that is coupled to an input of the torque converter may require the bypass clutch to remain locked until the vehicle obtains a much lower speed (down to a vehicle speed of zero).

Figure 3:
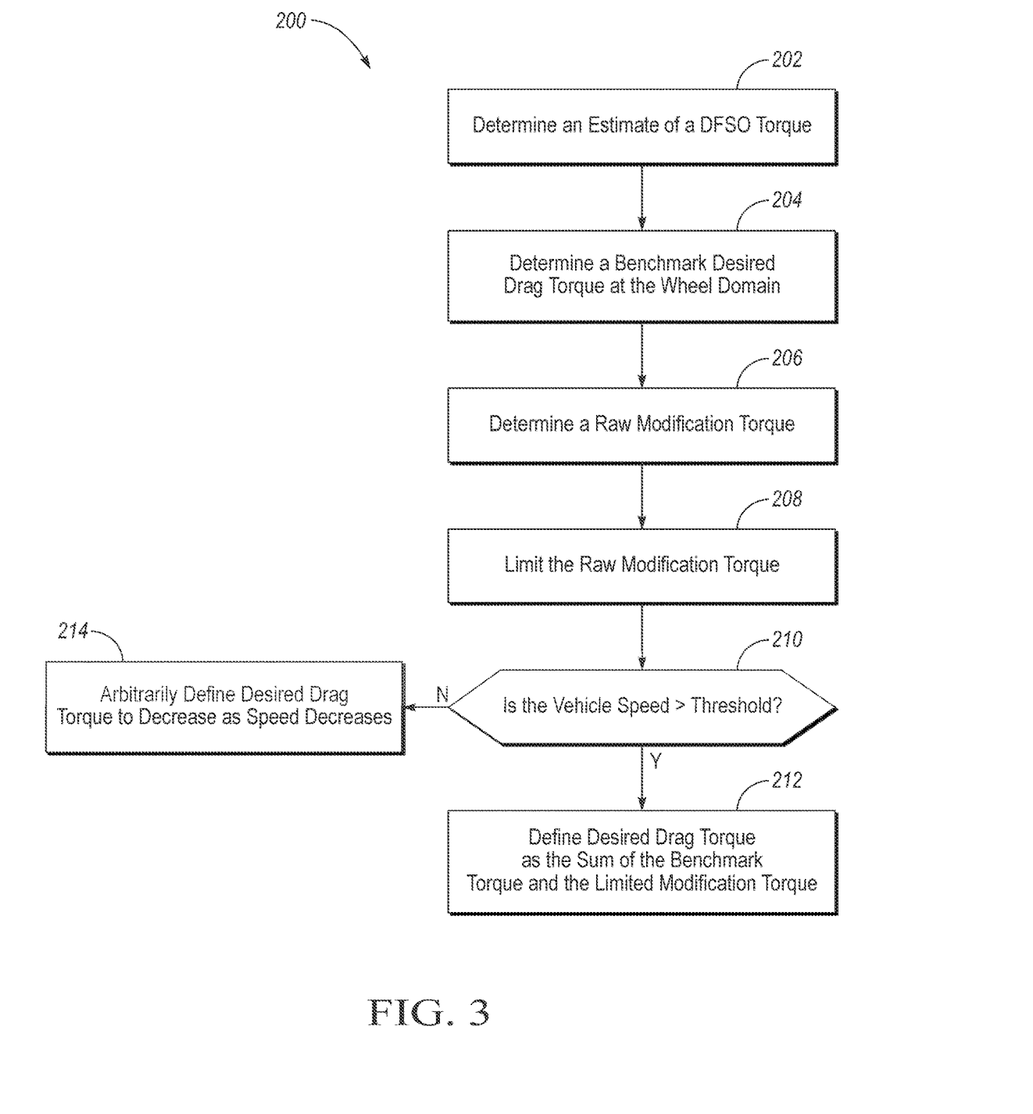
FIG. 3 is flowchart illustrating a representative deceleration control system for the hybrid vehicle.

Referring to FIG. 3 a representative deceleration control system 200 (or method) for the HEV 10 is illustrated. The control system 200 maintains a locked condition of the torque converter bypass clutch 34 at much lower speeds than in a conventional vehicle to utilize the M/G 18 during a deceleration event to convert the kinetic energy of the HEV 10 into electrical power to either charge the battery 20 or to power one or more vehicle accessories 62. The torque converter bypass clutch 34 may remain in the locked condition until the HEV 10 comes to a complete stop (i.e., has a vehicle speed of zero) during the deceleration event. The control system 200 utilizes the DFSO torque of the engine 14 and/or the torque created by the M/G 18 acting as a generator to decelerate the HEV 10 during the deceleration event. The control system 200 may be implemented via algorithms and/or control logic that are stored within the memory of the controller 50.

The control system 200 first determines an estimate of a DFSO torque at block 202. The DFSO torque estimate at the highest gear ratio of the transmission gearbox 24 may be used as a benchmark torque value for a desired drag torque during a desired deceleration event. More specifically, the DFSO torque estimate may be a torque estimate based on a virtual impeller speed (which may correspond to the speed of the M/G shaft 30). The virtual impeller speed may be based on current vehicle speed with the transmission gearbox 24 in the highest gear ratio. It should be understood that the estimated DFSO torque is being used as a benchmark and that an actual deceleration torque may be applied by either the engine 14 or the M/G 18 alone or a combination of the engine 14 and M/G 18. The desired drag torque may also be referred to as the desired accelerator lift pedal torque (which is the desired drag torque resulting from an operator releasing the accelerator pedal 52) and the desired deceleration event may be referred to as an accelerator lift pedal event (which is an event corresponding to the operator releasing the accelerator pedal). Next, at block 204, the benchmark torque value for the desired drag torque based on the DFSO torque estimate is converted to a desired torque value at the wheels 42 based on the following equation:

$$T_{bench} = T_{engine\_frc\_est}(\omega_{imp}) * N_{trans} * N_{final} \qquad (1)$$

where, $T_{bench}$ is the benchmark for the desired drag torque, $T_{engine\_frc\_est}(\omega_{imp})$ is the estimated friction torque of the engine 14 which is a function of the virtual rotational speed of the impeller $\omega_{imp}$ (which is an estimated impeller speed based on current vehicle speed with the transmission gearbox 24 in the highest gear ratio), $N_{trans}$ is the gear ratio of the transmission gearbox 24 while in the highest gear (the highest input to output gear ratio of the transmission gearbox), and $N_{final}$ is the final drive ratio between the output of the transmission gearbox 24 and the wheels 42 that accounts for any additional gear ratios that may be located between the transmission gearbox 24 and the wheels 42 (e.g., the gear ratio of the differential 40).

The control system 200 then determines a raw modification torque that accounts for a desired electrical power output of the M/G 18. The desired electrical power output of the M/G 18 may include a desired charging power to recharge the battery 20 and/or a desired operating power to operate at least one of the vehicle accessories 62. The raw modification torque is determined at block 206 based on the following equation:

$$T_{mot\_adj\_raw} = \frac{P_{acc\_dmd}(t)}{\omega_{whl}} + \frac{P_{bat\_chrg}(\omega)}{\omega_{whl}} \qquad (2)$$

where $T_{mot\_adj\_raw}$ is raw modification torque, $P_{acc\_dmd}(t)$ is a time dependent load to operate at least one of the vehicle accessories (e.g., turning on/off an air conditioning load), $P_{bat\_chrg}(\omega)$ is a calibratable additional desired battery charge power, which determines how fast the battery 20 will charge when the engine 14 is in a DFSO torque mode, and $\omega_{whl}$ is the rotational speed of the wheels 42.

Once the raw modification torque is determined, the system 200 moves on to block 208 where the raw modification torque is limited to a value that does not exceed a portion or percentage above the DFSO (or benchmark) torque $T_{bench}$. The limited modification torque represents a portion of the desired drag torque that is applied with the M/G 18 during a deceleration event and may be represented by the following term:

$$T_{mot\_adj} = \min\left(\frac{P_{acc\_dmd}(t)}{\omega_{whl}} + \frac{P_{bat\_chrg}(\omega)}{\omega_{whl}}, a\% * T_{bench}\right) \quad (3)$$

where $T_{mot\_adj}$ is limited modification torque and a % is a limiting factor. The limiting factor a % may be a calibratable single value, a percentage above the DFSO torque, or a curve that is a function of the rotational speed of the wheels $\omega_{whl}$. The term $a\% * T_{bench}$ sets an upper bound for the $$\frac{P_{acc\_dmd}(t)}{\omega_{whl}} + \frac{P_{bat\_chrg}(\omega)}{\omega_{whl}}$$

term such that variation of the limited modification torque $T_{mot\_adj}$ is bound when either or both the $$\frac{P_{acc\_dmd}(t)}{\omega_{whl}}$$

term and the $$\frac{P_{bat\_chrg}(\omega)}{\omega_{whl}}$$

term vary between zero and a highest value. The term $$\frac{P_{acc\_dmd}(t)}{\omega_{whl}}$$

may become zero when the operator, for example, switches off the accessories (e.g., air-conditioning system) 62. The term $$\frac{P_{bat\_chrg}(\omega)}{\omega_{whl}}$$

may become zero when the battery 20 is fully charged.

The system 200 then moves on to block 210 where it is determined if the vehicle speed is greater or less than a threshold speed. Alternatively it may be determined if the rotational speed of the wheels $\omega_{whl}$ is greater or less than a threshold at block 210. If the vehicle speed is greater than the threshold, the system 200 moves on to block 212 where the desired drag torque will be defined as the sum of DFSO (or benchmark) torque $T_{bench}$ and the limited modification torque $T_{mot\_adj}$ and may be represented by the following equation:

$$T_{lfdmd}(\omega)|_{(\omega > threshold\ speed)} = T_{bench} + T_{mot\_adj} \quad (4)$$

where $T_{lfdmd}(\omega)|_{(\omega > threshold\ speed)}$ is the desired drag torque at the wheels 42.

If the vehicle speed is less than the threshold, the system 200 moves on to block 214 where the desired drag torque is arbitrarily defined to monotonically decrease as vehicle speed (or rotational speed of the wheels $\omega_{whl}$) decreases. The desired drag torque may monotonically decrease at a first rate at block 214. Once the vehicle speed (or rotational speed of the wheels $\omega_{whl}$) falls below a second threshold, the desired drag torque may be set to zero. Once the desired drag torque is set to zero, the desired drag torque may monotonically decrease at a second rate, which may be greater in magnitude than the first rate in block 214, until the desired drag torque is zero.

The limiting factor a % defined in block 208 prevents the modification torque from deviating from the DFSO torque beyond a desired amount. Allowing the modification torque to deviate from the DFSO torque beyond a desired amount may cause the HEV 10 to decelerate at a higher than expected or desired rate which may cause operator discomfort.

Figure 4:
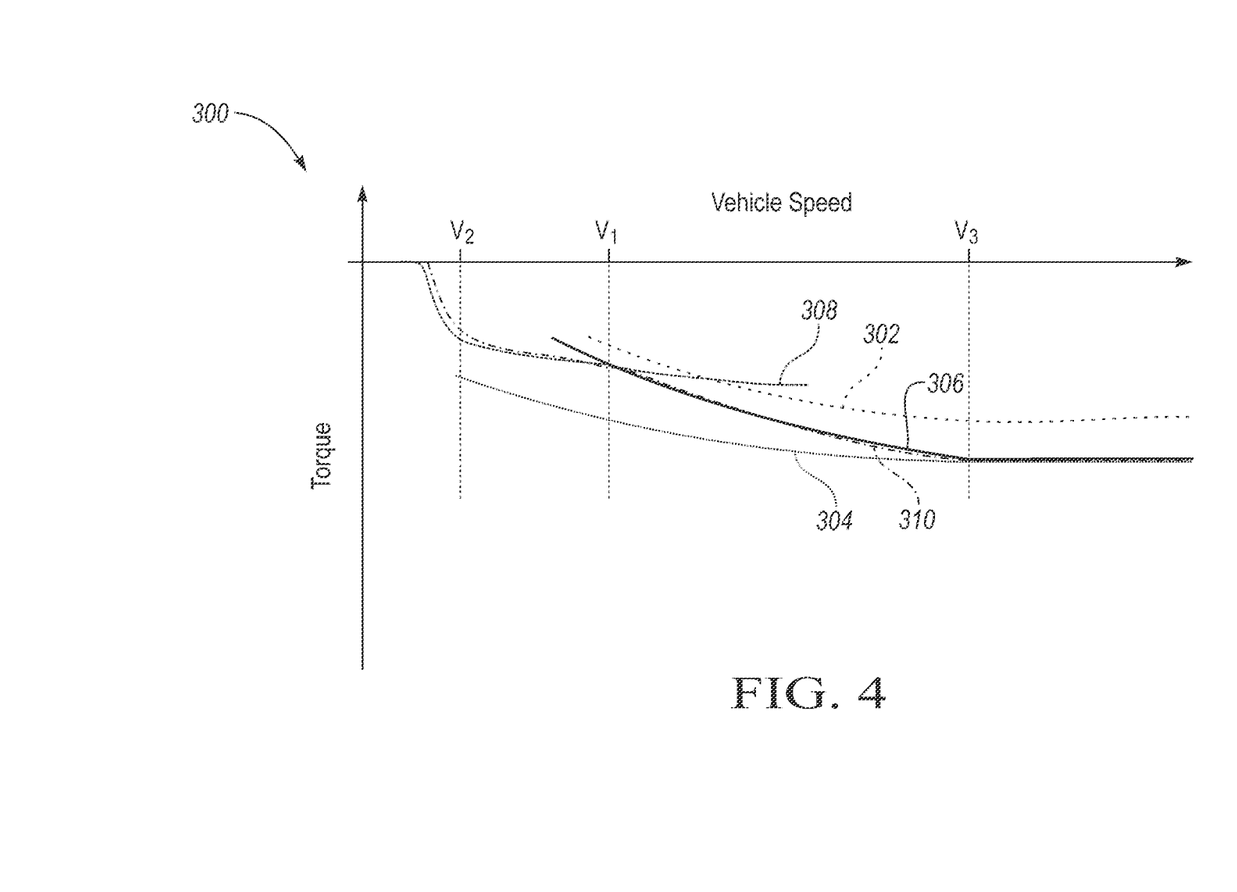
FIG. 4 is a representative graph illustrating a desired drag torque (or lift pedal torque) corresponding to vehicle speed.

Referring to FIG. 4 a representative graph 300 illustrating a desired drag torque (or lift pedal torque) corresponding to vehicle speed during a deceleration event (or lift pedal event) is illustrated. The deceleration event depicted in graph 300 is implemented according to the control system 200 via algorithms and/or control logic that are stored within the memory of the controller 50. Line 302 represents the DFSO torque (or benchmark torque) $T_{bench}$. Line 304 represent the sum of the benchmark torque $T_{bench}$ and the raw modification torque $T_{mot\_adj\_raw}$. Therefore, line 304 is the desired drag torque (produced by a combination of the engine 14 and M/G 18 or by the M/G 18 alone) that is capable of generating the electrical power with the M/G 18 during the deceleration event to meet the electric power demands of both the battery 20 and the accessories 62. Line 306 represents the sum of the benchmark torque $T_{bench}$ and the limited modification torque $T_{mot\_adj}$, which is equal to the desired drag torque at the wheels $T_{lfdmd}(\omega)|_{(\omega > threshold\ speed)}$. Line 308 represents the arbitrarily defined desired drag torque that monotonically decreases as the speed decreases. Line 306 will dictate the value of a commanded (or requested) drag torque when the vehicle speed is greater than a first threshold speed, which is represented by $V_1$. Line 308 will dictate the value of the commanded desired drag torque when the vehicle speed is less than the first threshold speed $V_1$. Line 310 represents the commanded desired drag torque. Line 306 and line 308 will have an interaction point at the first threshold speed $V_1$ where the value of the desired drag torque switches from being dictated by line 306 to line 308. The desired drag torque at line 306 and the desired drag torque at line 308 will have equal values at the first threshold speed $V_1$ to prevent a sudden drop in torque during the deceleration event.

During a first period of time during the deceleration event, corresponding to a period of time prior to the vehicle speed falling below the first threshold speed $V_1$, the commanded desired drag torque 310 is limited to the sum of the benchmark torque $T_{bench}$ and the limited modification torque $T_{mot\_adj}$ (line 306) which is less than the sum of the benchmark torque $T_{bench}$ and the raw modification torque $T_{mot\_adj\_raw}$ (line 304). During this period of time the drag torque is limited such that the M/G 18 generator torque does not produce the desired electrical power output to meet the charging demand of the battery 20 and/or the electrical power request of the accessories 62.

During a second period of time during the deceleration event, corresponding to a period of time after the vehicle speed falls below the first threshold speed $V_1$ but while the vehicle speed remains above a second threshold speed $V_2$, the commanded desired drag torque 310 is dictated by the arbitrarily defined desired drag torque 308 and monotonically decreases at a first rate. Once the vehicle speed decreases below the second threshold speed $V_2$, the commanded desired drag torque 310 is still dictated by the arbitrarily defined desired drag torque 308. However, the commanded desired drag torque after the vehicle speed decreases below the second threshold speed $V_2$ monotonically decreases at a second rate (which may be greater in magnitude than the first rate) to zero during a third period of time.

The graph 300 also depicts a period during the deceleration event, corresponding to a vehicle speed of greater than $V_3$, where the sum of the benchmark torque $T_{bench}$ and the limited modification torque $T_{mot\_adj}$ 306 is greater than the sum of the benchmark torque $T_{bench}$ and the raw modification torque $T_{mot\_adj\_raw}$ 304. During this period of time the sum of the benchmark torque $T_{bench}$ and the raw modification torque $T_{mot\_adj\_raw}$ 304 will dictate the commanded desired drag torque.

With regard to the desired drag torque values described above, it should be understood that an increase or a decrease in any of the drag torque values or any rate at which the drag torque values may change should be interpreted as an absolute value. Therefore, an increase in a negative drag torque value should be construed as a negative value that is farther away from zero and a decrease in a negative drag torque value should be construed as a negative value that is closer to zero.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle control system comprising:
a controller programmed to, in response to an accelerator lift-pedal event, generate a drag torque, with at least one of an engine and electric machine, having a magnitude that is based on a deceleration fuel shut-off torque of the engine and a desired power output of the electric machine, and limit the drag torque to a threshold value that is based on the deceleration fuel shut-off torque.

2. The system of claim 1, wherein the desired power output is based on a desired charging power to recharge a traction battery.

3. The system of claim 2, wherein the desired power output is based on a desired operating power to operate at least one vehicle accessory.

4. The system of claim 3, wherein the controller is further programmed to limit the drag torque such that the electric machine does not produce the desired power output.

5. The system of claim 3, wherein the at least one vehicle accessory is an air conditioning system.

6. The system of claim 3, wherein the at least one vehicle accessory is a power steering system.

7. The system of claim 1, wherein the controller is further programmed to limit the drag torque while a speed of the vehicle is greater than a first threshold speed.

8. The system of claim 7, wherein the controller is further programmed to decrease the drag torque at a rate that depends on whether a speed of the vehicle is less than a second threshold speed.

9. A vehicle control system comprising:
a controller programmed to, in response to a commanded magnitude of drag torque, that (i) results from an accelerator lift-pedal event and (ii) is based on an engine fuel shut-off torque and a generator torque required to produce a desired amount of electrical power, exceeding a threshold that is based on the engine fuel shut-off torque, generate an actual drag torque having a magnitude that does not exceed the threshold such that the generator torque produces less than the desired amount of electrical power.

10. The system of claim 9, wherein the desired amount of electrical power is based on a desired charging power to recharge a traction battery.

11. The system of claim 9, wherein the desired amount of electrical power is based on a desired operating power to operate at least one vehicle accessory.

12. The system of claim 11, wherein the at least one vehicle accessory is an air condition system.

13. The system of claim 11, wherein the at least one vehicle accessory is a power steering system.

14. A vehicle comprising:
an engine and generator respectively configured to, in response to an accelerator pedal lift-off event, produce a fuel shut-off torque and produce a drag torque; and
a controller programmed to, in response to a sum of the fuel shut-off torque and drag torque exceeding a threshold, limit the drag torque such that the generator generates an amount of electrical power less than a desired amount of electrical power.

15. The vehicle of claim 14, wherein the desired amount of electrical power is based on a desired charging power to recharge a traction battery.

16. The vehicle of claim 15, wherein the desired amount of electrical power is based on a desired operating power to operate at least one vehicle accessory.

17. The vehicle of claim 16, wherein the at least one vehicle accessory is an air conditioning system.

18. The vehicle of claim 16, wherein the at least one vehicle accessory is a power steering system.

* * * * *